(12) United States Patent  (10) Patent No.: US 6,604,896 B2
Feldman et al.  (45) Date of Patent: Aug. 12, 2003

(54) DEVICES FOR EXACTLY POSITIONING A WORKPIECE AND A TOOL MACHINING THE WORKPIECE

(75) Inventors: Zvi Feldman, Zoran (IL); Yehuda Avikazar, Netanya (IL)

(73) Assignee: Opti-Clip International LLC, Boca Raton, FL (US)

(*) Notice: Subject to any disclaimer, the term of this patent is extended or adjusted under 35 U.S.C. 154(b) by 0 days.

(21) Appl. No.: 09/863,287

(22) Filed: May 24, 2001

(65) Prior Publication Data

US 2002/0008343 A1 Jan. 24, 2002

(30) Foreign Application Priority Data

May 25, 2000 (IL) .................................................. 136364

(51) Int. Cl.[7] .................................................. B23C 1/14
(52) U.S. Cl. ...................... 409/166; 409/221; 74/813 R
(58) Field of Search .............................. 409/5, 11, 76, 409/77, 165, 166, 169, 130, 123, 122, 221; 451/140, 143, 145, 255, 256, 397, 398, 413; 74/813 R

(56) References Cited

U.S. PATENT DOCUMENTS

| | | | | |
|---|---|---|---|---|
| 1,737,002 A | * | 11/1929 | De Vlieg | 33/569 |
| 2,507,547 A | * | 5/1950 | Shephard | 409/165 |
| 3,975,866 A | * | 8/1976 | Walker | 409/131 |
| 4,987,668 A | * | 1/1991 | Roesch | 409/145 |
| 5,097,630 A | * | 3/1992 | Maeda et al. | 451/134 |
| 5,431,514 A | * | 7/1995 | Saito et al. | 409/132 |
| 5,634,250 A | * | 6/1997 | Mihailovic | 29/26 A |
| 5,727,296 A | * | 3/1998 | Kobler | 29/27 C |
| 5,871,314 A | * | 2/1999 | Trionfetti | 409/162 |
| 5,938,381 A | * | 8/1999 | Diehl et al. | 409/131 |
| 6,027,288 A | * | 2/2000 | Senjo | 409/138 |

* cited by examiner

Primary Examiner—Daniel W. Howell
(74) Attorney, Agent, or Firm—Oliff & Berridge, PLC

(57) ABSTRACT

Devices adapted to position exactly a workpiece and a machine tool for machining the workpiece to create a shaped article that conforms to a specification therefor. The device for positioning the workpiece includes a rotary table in which the workpiece is held so that it can be machined in the round by the tool. The table is turned by a slider that is driven by a stepping motor and is reciprocated by a pair of drums which are linked by flexible metal bands to opposite ends of the slider. When the motor causes the drums to rotate clockwise, the slider is then pulled in one direction by the bands, and when the drums are caused to rotate counterclockwise, the slider then advances in a reverse direction. A similar device serves to exactly position the machine tool.

6 Claims, 2 Drawing Sheets

DEVICES FOR EXACTLY POSITIONING A WORKPIECE AND A TOOL MACHINING THE WORKPIECE

BACKGROUND OF THE INVENTION

1. Field of Invention

This invention relates generally to apparatus for machining a workpiece to create a shaped article that conforms to a specification therefor, and more particularly to devices for accurately positioning the workpiece in the course of a manufacturing procedure and for accurately positioning the machine tool engaging the workpiece.

2. Description of Related Art

In a typical machine for manufacturing a shaped article that conforms to a predetermined specification, the workpiece or blank to be machined is held on a horizontal table. This table is movable in X and Y directions to position the workpiece relative to the machine tool for shaping it, the tool being movable in the Z direction. Hence, in the course of a machining operation, the tool cuts material from the workpiece as it changes its position.

The present invention is concerned with those articles of manufacture which must be machined in the round to create the desired configuration and therefore requires that the workpiece be rotated as it is being cut. An example of one such article is an eyeglass lens whose simplest shape is a pure circle. But modern eyeglass lenses, particularly those referred to as "designer" eyeglasses are non-circular and may have relatively complex contours.

In order to machine a blank for a designer lens, the blank must be held on a rotary worktable which is turned with respect to a machine tool that cuts into the periphery of the blank to contour the blank in accordance with the designer's specification.

In order to precisely conform the configuration of the lens to the designer's specification, the rotary position of the worktable and the axial position of the machine tool must be precisely coordinated to correctly contour the workpiece. While existing machines for these purposes are capable of accurately positioning the workpiece as well as the tool, they are highly complex and costly, and contribute significantly to the expenses incurred in manufacturing the lenses.

SUMMARY OF THE INVENTION

In view of the foregoing the main object of this invention is to provide devices for precisely positioning a workpiece and a machine tool engaging the workpiece so as to manufacture a shaped article that conforms to a specification therefor.

More particularly, an object of this invention is to provide devices of the above type which are driven by a stepping motor that acts through a reciprocating mechanism to precisely position the workpiece and the tool.

A significant advantage of these devices is that they are uncomplicated and less costly than existing devices for the same purpose, thereby reducing the expenses incurred in manufacturing a shaped article.

Briefly stated, these objects are attained in devices adapted to position exactly a workpiece and a machine tool for machining the workpiece to create a shaped article that conforms to a specification therefor. The device associated with the workpiece includes a rotary table in which the workpiece is held so that it can be machined in the round by the tool. The table is turned by a slider that is driven by a stepping motor and is reciprocated by a pair of drums which are linked by flexible metal bands to opposite ends of the slider. Then when the motor causes the drums to rotate clockwise, the slider is pulled in one direction by the bands, and when the drums are caused to rotate counterclockwise, the slider is pulled in a reverse direction. A similar device serves to exactly position the machine tool.

BRIEF DESCRIPTION OF THE DRAWINGS

For a better understanding of the invention as well as other objects and features thereof, reference is made to the annexed drawing wherein.

DETAILED DESCRIPTION OF PREFERRED EMBODIMENTS

Figure 1:
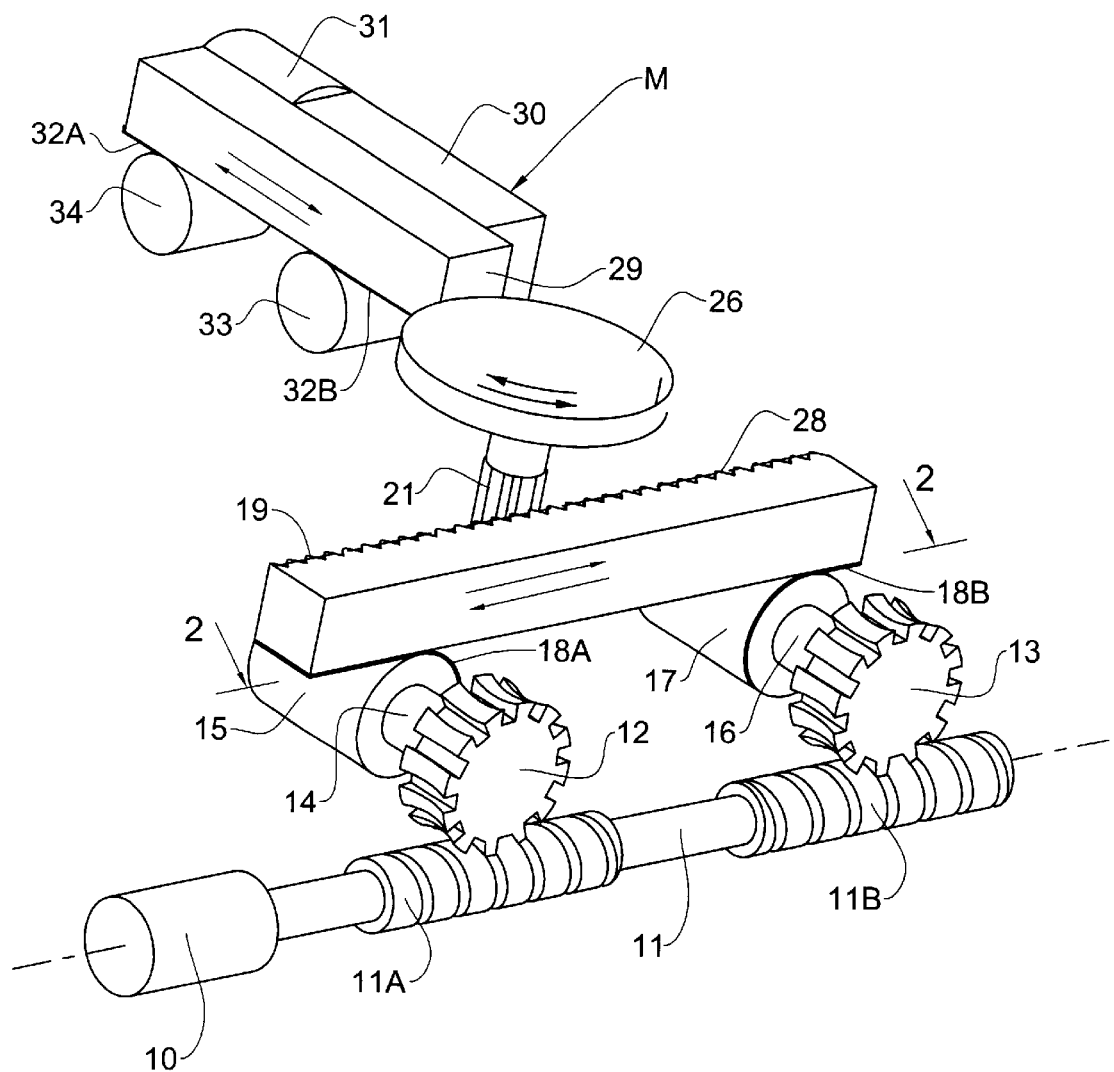
FIG. 1 is a perspective view of a device in accordance with the invention which makes it possible to exactly machine a workpiece to create a manufactured article that conforms to a specification therefor.
Figure 2:
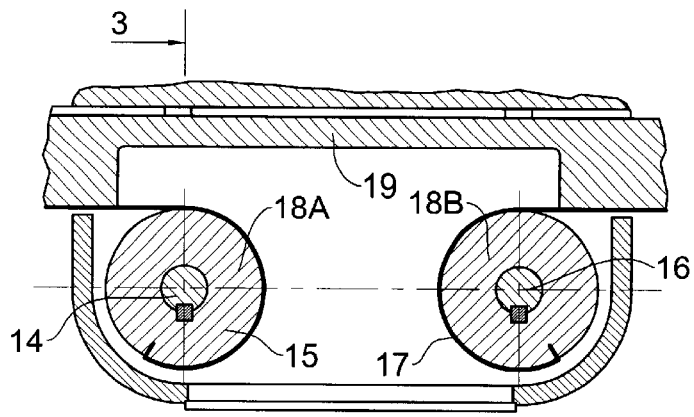
FIG. 2 is a sectional view of the device taken in the plane indicated by line 2—2 in FIG. 1.

Referring now to the figures of the drawing, a device in accordance with the invention is adapted to exactly position a workpiece to be machined which is placed on a rotary table with respect to a milling or other machine for machining the workpiece as it rotates. The entire periphery of the workpiece is machined so that its profile conforms to the specification for the article to be manufactured. Thus if the article is a lens of a predetermined shape for eyeglasses, then a blank of the material from which the lens is formed must be machined to assume the desired configuration.

The device includes a stepping motor 10 which is computer-controlled to drive a shaft 11 on which is mounted a pair of worm gears 11A to 11B. These worm gears engage worm wheels 12 and 13. Wheel 12 drives a shaft 14 which rotates a cylindrical drum 15, while wheel 13 concurrently drives a shaft 16 that turns a drum 17 having the same diameter as drum 15.

Drum 15 is linked by a flexible steel band 18A to one end of a bar-like slider 19. Drum 17 is linked by a like steel band 18B to the opposite end of bar 19. The arrangement is such that when drums 15 and 17 are caused by motor 10 to concurrently rotate clockwise, the drums then by means of bands 18A and 18B pull the slider in the right direction, and when the drums are caused to rotate counterclockwise, the slider is then pulled in the left direction. The reason therefore for a pair of drums rather than a single drum to reciprocate slider 19 is to provide a pull-pull translation of the slider, not a push-pull action.

Figure 3:
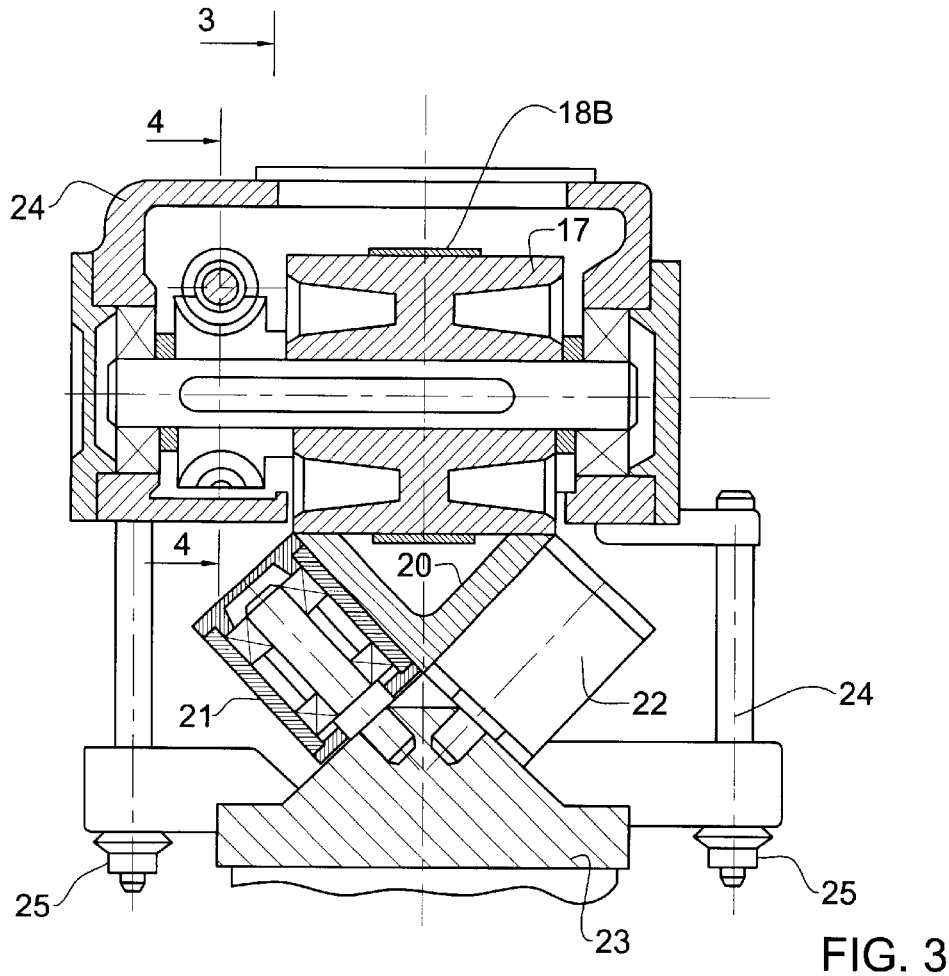
FIG. 3 is a transverse section taken in a plane indicated by line 3—3 in FIG. 2.
Figure 4:
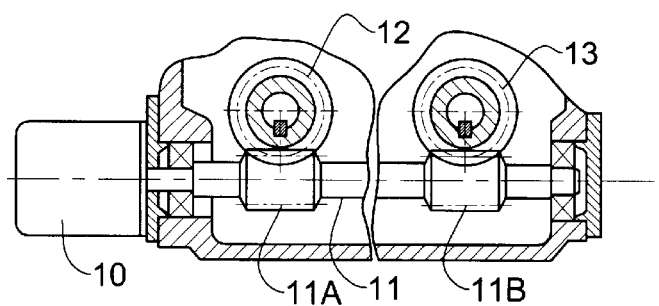
FIG. 4 is a transverse section taken in the plane indicated by line 4—4 in FIG. 2.

Then when stepper motor 10 rotates stepwise in a given direction controlled in accordance with a computer program, one band is unwound from its drum while the other band is wound about its drum. This action displaces a mobile link member 20 having a triangular cross section whose angled sides engage a pair of inclined rollers 21 and 22, as shown in FIG. 3, as well as drums 17 and 18.

Rollers 21 and 22 are mounted on a rack 23 coupled by bars 18 to the body 24 of the device, the bars being held to the rack by Bellevile washers 25.

The rotary worktable 26, on which a workpiece is to be placed for machining by a milling or other machine, which is generally identified by the letter M, worktable 26 is coupled by a pinion 27 which meshes with a row of rack teeth 28 on slider 19. Hence when the slider advances in one direction, the table turns clockwise, and when it advances in the reverse direction, the table turns counterclockwise.

The mechanical system operated by stepping motor 10 is free of play or tolerance, for the drum bands on the slider are directly responsive to a stepping motor action. Thus with each step, the slider makes an incremental advance and it is possible therefore to precisely position the slider and the worktable coupled thereto.

The device for operating milling machine M is essentially the same as that operating the worktable in which the workpiece is placed. It includes a slider 29 reciprocated a mechanism 30 driven by a stepping motor 31.

Slider 29 is linked by steel bands 32A and 32B which couple opposite ends of the slider to cylindrical drums 33 and 34. The position of the cutting tool relative to the workpiece is therefore controlled by the stepping motor 31 in accordance with a computer program.

In the case of a workpiece which is a blank for creating an eyeglass lens, as this blank rotates on turntable 26 under the control of stepping motor 10, it is contour cut by the machine tool under the control of stepping motor 31. Machining of the blank takes place in a continuous peripheral loop in which the respective positions of the tool and the blank being machined thereby are precisely controlled.

While there has been disclosed a preferred embodiment of devices for exactly positioning a workpiece with respect to a tool for machining the workpiece, it is to be understood that many changes may be made therein without departing from the spirit of the invention.

What is claimed is:

1. An apparatus for machining a workpiece to create a manufactured article having a desired configuration, which apparatus comprising:

a rotary worktable on which the workpiece is held, a machine tool which engages the periphery of the workpiece on the worktable to remove material therefrom to shape the workpiece, a first device associated with the worktable to rotate the workpiece so as to precisely position it with respect to the tool, and a second device associated with the tool to precisely position it with respect to the workpiece as it is rotated, wherein the second device includes a slider that is coupled to the tool to cause the tool to advance toward or away from the periphery of the workpiece on the table, and wherein an advance of the slider is effected by a pair of drums linked by steel bands to opposite ends of the slider.

2. The apparatus as set forth in claim 1, in which the drums are concurrently driven by a stepping motor.

3. An apparatus for machining a workpiece to create a manufactured article having a desired configuration, which apparatus comprising:

a rotary worktable on which the workpiece is held, a machine tool which engages the periphery of the workpiece on the worktable to remove material therefrom to shape the workpiece, a first device associated with the worktable to rotate the workpiece so as to precisely position it with respect to the tool, and a second device associated with the tool to precisely position it with respect to the workpiece as it is rotated, wherein said first device includes a slider coupled to the worktable to cause the table to turn clockwise when the slider is advanced in one direction, and to turn counterclockwise when the slider is advanced in a reverse direction, and wherein an advance of the slider is effected by a pair of drums, one being linked by a flexible metal band to one end of the slider, the other being linked by a flexible metal band to the opposite end of the slider whereby when the drums simultaneously rotate, the slider is caused to advance in a direction that depends on the direction of drum rotation.

4. The apparatus as set forth in claim 3, in which the drums are each provided with a worm wheel driven by a worm shaft.

5. The apparatus as set forth in claim 4, in which the worm shaft is driven by a stepping motor.

6. The apparatus as set forth in claim 3, in which the worktable is mounted on a shaft provided with a pinion that engages rack teeth on the slider, whereby when the slider advances, the worktable is caused to turn.

* * * * *